United States Patent [19]
Kim

[11] Patent Number: 5,734,657
[45] Date of Patent: Mar. 31, 1998

[54] ENCODING AND DECODING SYSTEM USING MASKING CHARACTERISTICS OF CHANNELS FOR BIT ALLOCATION

[75] Inventor: Seoung-bong Kim, Suwon, Rep. of Korea

[73] Assignee: Samsung Electronics Co., Ltd., Kyungki-Do, Rep. of Korea

[21] Appl. No.: 380,614

[22] Filed: Jan. 30, 1995

[30] Foreign Application Priority Data

Jan. 28, 1994 [KR] Rep. of Korea ............ 94-1577

[51] Int. Cl.[6] ........................................ G10L 9/00
[52] U.S. Cl. .................. 370/437; 395/2.38; 395/2.39
[58] Field of Search .................. 395/2.09, 2.12, 395/2.14, 2.35, 2.36, 2.37, 2.38, 2.39, 239, 2.1, 2.2; 381/29, 34, 36, 40, 41; 370/431, 437

[56] References Cited

U.S. PATENT DOCUMENTS

| | | | |
|---|---|---|---|
| 4,896,362 | 1/1990 | Veldhuis et al. | 395/2.38 |
| 4,972,484 | 11/1990 | Theile et al. | 395/2.38 |
| 5,105,463 | 4/1992 | Veldhuis et al. | 395/2.38 |
| 5,301,255 | 4/1994 | Nagai et al. | 395/239 |
| 5,309,232 | 5/1994 | Hartung et al. | 348/384 |
| 5,375,189 | 12/1994 | Tsutsui et al. | 395/2.38 |
| 5,394,473 | 2/1995 | Davidson | 381/36 |
| 5,479,562 | 12/1995 | Fielder et al. | 395/2.38 |
| 5,490,130 | 2/1996 | Akagiri et al. | 369/124 |
| 5,491,773 | 2/1996 | Veldhuis et al. | 395/2.38 |
| 5,495,552 | 2/1996 | Sugiyama et al. | 395/2.1 |

Primary Examiner—Douglas W. Olms
Assistant Examiner—Ricky Q. Ngo
Attorney, Agent, or Firm—Sughrue, Mion, Zinn, Macpeak & Seas, PLLC

[57] ABSTRACT

An encoding apparatus which utilizes masking characteristics of channels for bit allocation in order to encode digitally sampled audio signals of at least two channels in units of an audio frame, allocates the bits to the divided bands of the first and second channels, detects a channel having a masking to noise ratio in which the respective divided bands exceed the masking threshold value based on the first masking threshold value with respect to the first channel and the second masking threshold value with respect to the second channel, and uses all the number of the bits which are not used for the channel among the total number of the bits of one audio frame for bit allocation of the other channel, thereby improving the quality of the sound even when an audio signal which includes many high frequency components is reproduced.

18 Claims, 4 Drawing Sheets

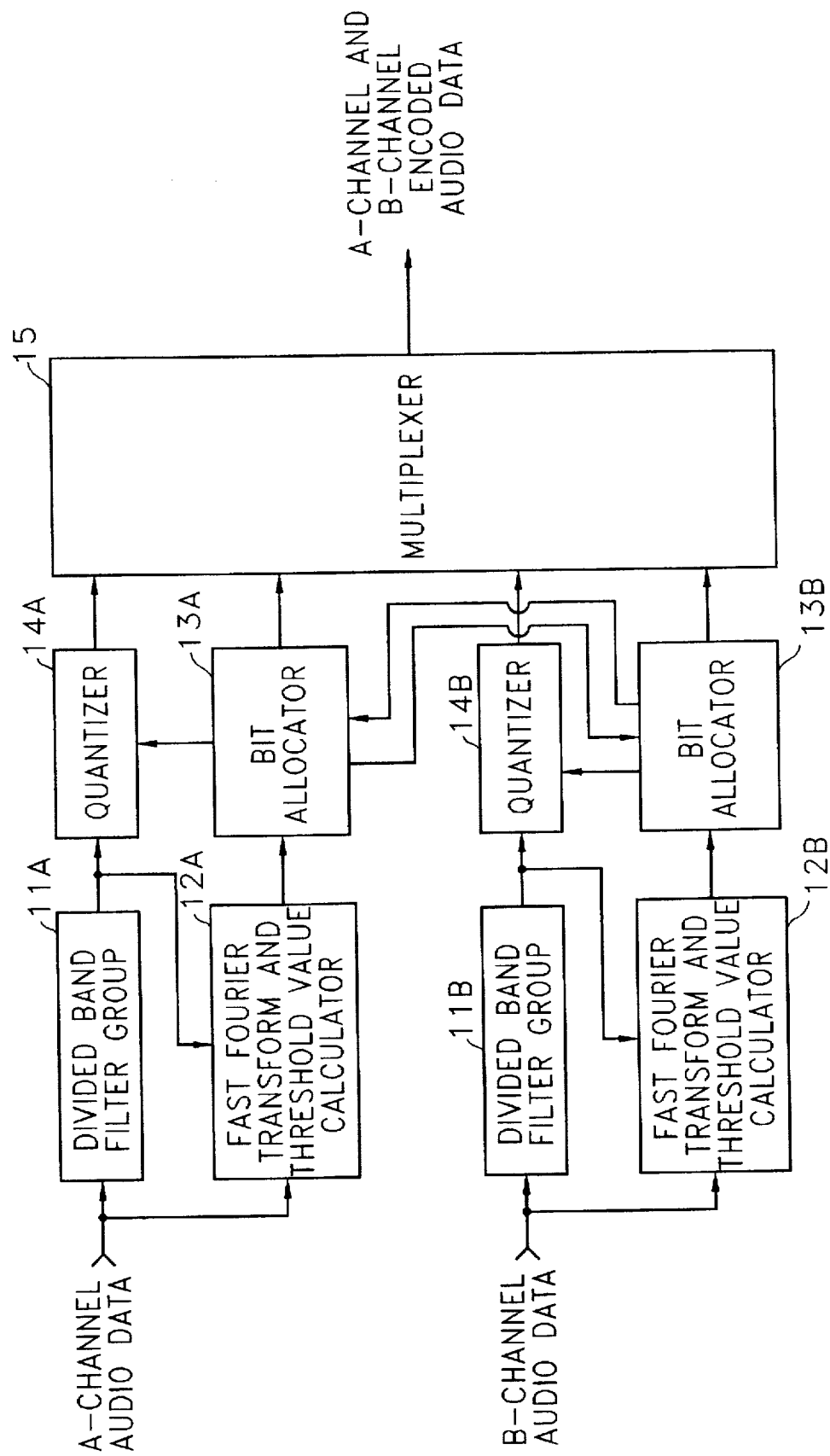

ENCODING AND DECODING SYSTEM USING MASKING CHARACTERISTICS OF CHANNELS FOR BIT ALLOCATION

BACKGROUND OF THE INVENTION

1. Field of the Invention

The present invention relates to an encoding and decoding system which utilizes masking characteristics of channels for bit allocation, and more particularly to an encoding and decoding system using masking characteristics of channels for bit allocation for quantizing an audio signal during encoding of divided bands.

2. Description of Related Art

Generally, in digital audio products such as a digital video cassette recorder (VCR), a high-definition television (HDTV), a digital compact cassette (DCC), a multimedia system, and a digital broadcasting system (DBS), an analog audio signal is sampled and the sampled audio signal is converted into a digital audio signal so as to be recorded on a medium or to be transmitted. However, to record and reproduce or to transmit and receive the sampled digital audio signal, a channel having a bit rate of more than 700 Kbps is required. Accordingly, it has been difficult to apply conventional encoding technology to certain products because of the large amount of data required. To solve this difficulty, various encoding methods for compressing data by a factor greater than four while maintaining the quality of the audio signal have been proposed. Among them is an encoding method using variable bit allocation. In the variable bit allocation method of the moving picture expert group (MPEG), the sampled audio signal band is divided into divided bands using a subband filter group, and a masking threshold value, which is varied according to a desired audio quality in conjunction with characteristics of an audio source, is calculated according to characteristics of the human auditory system, thereby adaptively allocating a number of bits to each divided band. Such a variable bit allocation method of the MPEG will be described below with reference to FIGS. 1A through 1C.

FIGS. 1A through 1C are graphical views for explaining a method of allocating bits to each divided band by a conventional variable bit allocation encoding method. FIGS. 1A through 1C schematically show a digital audio signal which is divided into thirty-two frequency bands each of which has a predetermined width A. FIG. 1A shows a masking to noise ratio (MNR) with respect to each frequency divided band in an initial state prior to bit allocation. FIG. 1B shows an MNR with respect to each divided band during bit allocation. FIG. 1C shows an MNR with respect to each divided band after completion of bit allocation. Referring to FIGS. 1A through 1C, a conventional variable bit allocation method will be described below.

After calculation of initial values (illustrated as a solid line) of the MNR with respect to the divided bands has been completed, bit allocation for quantization starts from a divided band having the lowest MNR value. The divided band B of FIG. 1A having the lowest MNR value among the 32 divided bands has the value of its MNR increased through bit allocation as depicted by dotted line C. After completion of the bit allocation with respect to divided band B, a divided band D becomes the divided band having the lowest MNR value as shown in FIG. 1B. The divided band D has its MNR value increased through the bit allocation as shown by dotted line E. Such a process is repeated until the number of bits which are allocated to the divided bands is not larger than that permissible for one frame of an audio signal. After completion of the bit allocation the MNR values of most of the frequency bands of the audio signal are greater than zero, as shown in FIG. 1C. When the MNR values of all the divided bands become more than zero, the human auditory system cannot recognize noise even though noise is included in the audio signal. Thus, listeners cannot hear the noise (the quantization noise) of the frame. However, the MNR value after completion of the bit allocation is generally varied according to the class of the audio signal and a specific weight of the audio quality. For instance, since a human voice or a piano sound does not include a high frequency component, the MNR values of all the divided bands after completion of the bit allocation become more than zero. On the other hand, since a sound of a beat instrument includes a considerable high frequency component, the MNR values after completion of the bit allocation become less than zero. Therefore, the conventional variable bit allocation method of the MPEG causes the audio quality to be degraded due to the signal degeneration which occurs when reproducing an audio signal having many high frequency components, causing users to hear the noise.

SUMMARY OF THE INVENTION

Therefore, to solve the above problems, it is an object of the present invention to provide an encoding method which utilizes masking characteristics of channels for bit allocation so as to improve the quality of sound when reproducing an audio signal, in which when audio signals of two or more channels are encoded, a number of bits of a channel where an MNR value of each divided band is more than a predetermined value are reserved and a number of bits corresponding to the number of remaining bits are additionally allocated to each divided band of another channel having an MNR value less than the predetermined value.

It is another object of the present invention to provide an apparatus embodying the above encoding method.

It is still another object of the present invention to provide an apparatus for decoding an audio signal encoded by an encoding apparatus embodying one aspect of the present invention.

Thus, to accomplish one object of the present invention, there is provided an encoding method which utilizes masking characteristics of channels for bit allocation in order to encode digitally sampled audio signals of at least two channels in units of an audio frame, the encoding method comprising the steps of:

receiving a first channel audio signal, dividing the received first channel audio signal into predetermined divided bands to output the result, and calculating a first masking threshold value;

receiving a second channel audio signal, dividing the received second channel audio signal into predetermined divided bands to output the result, and calculating a second masking threshold value;

calculating a masking to noise ratio (MNR) through bit allocation for each of the first channel divided bands and each of the second channel divided bands, and comparing the calculated MNR with the first masking threshold value and the second masking threshold value corresponding to each channel;

detecting a channel having an MNR in which each bit allocated divided band exceeds a masking threshold value based on the compared result;

using the number of bits which are not used for bit allocation of the detected channel among the number of bits of one audio frame for bit allocation of the other channel, and producing bit allocation information corresponding to each channel and bit ratio information between the channels;

receiving the bit allocation information corresponding to each channel and quantizing the input audio signal of each channel to output the result; and multiplexing the bit ratio information, the bit allocation information and the quantized audio signal.

Also, to accomplish another object of the present invention, there is provided an encoding apparatus which utilizes masking characteristics of channels for bit allocation in order to encode digitally sampled audio signals of at least two channels in units of an audio frame, the encoding apparatus comprising:

a first divided band filter group for receiving a first channel audio signal, and dividing the received first channel audio signal into predetermined divided bands to output the result;

first threshold value calculation means for receiving an input audio signal and an output audio signal of the first divided band filter group, and calculating a first masking threshold value;

a second divided band filter group for receiving a second channel audio signal, and dividing the received second channel audio signal into predetermined divided bands to output the result;

second threshold value calculation means for receiving an input audio signal and an output audio signal of the second divided band filter group, and calculating a second masking threshold value;

bit allocation means for performing bit allocation to each first channel divided band and each second channel divided band, receiving the first masking threshold value and the second masking threshold value, detecting a channel having an MNR in which each bit allocated divided band exceeds a masking threshold value based on the compared result, using the number of bits which are not used for bit allocation of the detected channel among the number of bits of one audio frame for bit allocation of the other channel, and producing bit allocation information corresponding to each channel and bit ratio information between the channels;

first quantization means for receiving an audio signal output from the first divided band filter group and quantizing the received audio signal in response to the bit allocation information of the bit allocation means to output the result;

second quantization means for receiving an audio signal output from the second divided band filter group and quantizing the received audio signal in response to the bit allocation information of the bit allocation means to output the result; and multiplexing means for multiplexing signals output from the first and second quantization means, and the bit allocation information and the bit ratio information of the bit allocation means, to output the result.

Also, to accomplish still another object of the present invention, there is provided a decoding apparatus using masking characteristics of channels for bit allocation in order to distribute an encoded and multiplexed input audio bit stream of two channels into each channel and decode the distributed audio bit stream, the decoding apparatus comprising:

a first-in first-out (FIFO) memory storing a bit stream in which externally supplied two-channel audio data is mixed with each other according to a write enable-signal and outputting the stored data according to a read enable signal;

a first digital signal processor for generating a control signal for controlling a read operation by detecting an interrupt signal supplied from the FIFO memory, and receiving the two-channel audio bit stream read from the FIFO memory to decode only one-channel audio data;

control logic means for supplying the read enable signal to the FIFO memory according to the control signal supplied from the first digital signal processor; and a second digital signal processor for receiving the other channel audio data separated from the first digital signal processor and decoding the received other channel audio data.

BRIEF DESCRIPTION OF THE DRAWINGS

The preferred embodiments are described with reference to the drawings wherein:

FIG. 2 is a block diagram of an encoding apparatus using masking characteristics for bit allocation according to one preferred embodiment of the present invention.

DETAILED DESCRIPTION OF THE PREFERRED EMBODIMENT

Figure 1:
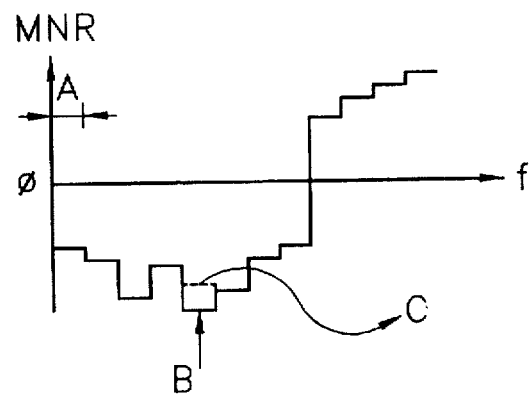
FIGS. 1A through 1C are graphical views for explaining a method for allocating bits to each divided band through the conventional variable bit allocation encoding method.
Figure 1:
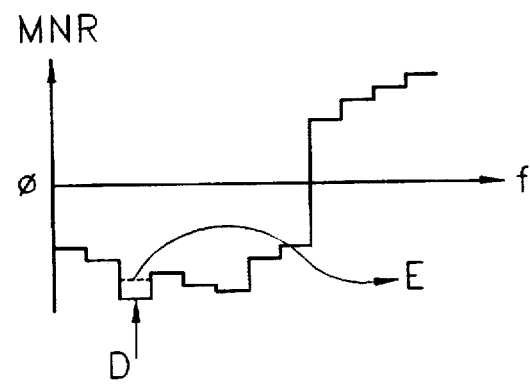
Figure 1:
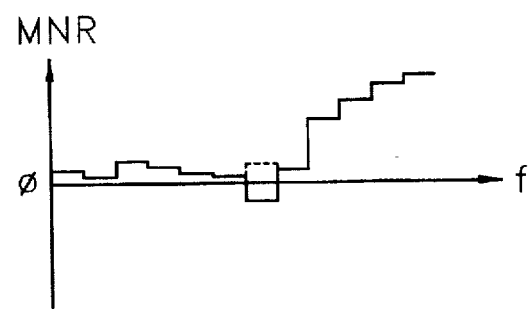

A preferred embodiment of the present invention will be described below in more detail with reference to the accompanying FIGS. 2 through 5.

FIG. 2 is a block diagram of an encoding apparatus using masking characteristics for bit allocation according to one preferred embodiment of the present invention. In FIG. 2 divided band filter group 11A divides a digitally sampled A-channel audio signal into N divided-band signals. The output of divided band filter group 11A is connected to a fast Fourier transform and threshold value calculator 12A and a quantizer 14A. Fast Fourier transform and threshold value calculator 12A receives an audio signal input to divided band filter group 11A and the divided-band signals output from divided band filter group 11A and calculates a first masking threshold value in which noise cannot be detected in view of a the characteristics of the human auditory system. A bit allocator 13A receives the first masking threshold value from fast Fourier transform and threshold value calculator 12A and generates bit allocation completion information with respect to all the A-channel divided bands. The bit allocation completion information is supplied to quantizer 14A. Quantizer 14A quantizes the output signal of divided band filter group 11A according to the bit allocation completion information supplied from bit allocator 13A, and outputs the quantized signal to multiplexer 15.

Bit allocator 13A is connected to a second bit allocator 13B for generating bit allocation completion information with respect to all the B-channel divided bands. The digitally sampled B-channel audio signal is supplied to a second divided band filter group 11B and a second fast Fourier transform and threshold value calculator 12B. Fast Fourier transform and threshold value calculator 12B generates a second masking threshold value and outputs the second masking threshold value to second bit allocator 13B. A second quantizer 14B quantizes the output signal divided band filter group 11B according to the bit allocation completion information supplied from bit allocator 13B, and outputs the quantized signal for multiplexer 15.

Bit allocators 13A and 13B are connected to each other so as to give and take information to and from each other. Bit allocator 13A and 13B generates bit allocation completion information corresponding to each channel or bit ratio information between channels. For example, if the B-channel bit allocator 13B generates the bit allocation completion information, A-channel bit allocator 13A which receives the bit allocation completion information generates the bit ratio information between the channels. Multiplexer 15 multiplexes the signals supplied from quantizers 14A and 14B and bit allocators 13A and 13B and outputs the result.

The operation of the FIG. 2 apparatus having the above construction will be described below.

The digitally sampled A-channel audio signal is applied to divided band filter group 11A and fast Fourier transform and threshold value calculator 12A, and the digitally sampled B-channel audio signal is applied to divided band filter group 11B and fast Fourier transform and threshold value calculator 12B. The blocks 11A, 12A, 13A and 14A for processing the A-channel audio signal and the blocks 11B, 12B, 13B and 14B for processing the B-channel audio signal perform similar operations until the bit allocation with respect to one channel is completed.

Such bit allocation will be described with respect to only the A-channel. Divided band filter group 11A divides the applied digitally sampled audio signal into a predetermined number of divided bands (thirty-two in case of the MPEG). Fast Fourier transform and threshold value calculator 12A receives an audio signal applied to divided band filter group 11A and an audio signal output from divided band filter group 11A, Fourier-transforms the received audio signals, analyzes the spectrum of the audio signals and calculates a first masking threshold value in which noise cannot be detected in view of the characteristics of the human auditory system. The calculated first masking threshold value is applied to bit allocator 13A. Bit allocator 13A performs bit allocation with respect to each divided band using a predetermined number of bits for an audio frame. Here, the bit allocation is performed with respect to the band having the lowest MNR until each divided band has an MNR which exceeds the first masking threshold value. In this manner, during the bit allocation with respect to the A-channel and B-channel divided bands, bit allocator 13A or 13B of the channel in which the bit allocation is accomplished generates bit allocation completion information and supplies the same to the other bit allocator 13B or 13A. Here, the channel in which the bit allocation is accomplished is the channel having an MNR in which each divided band for one audio frame exceeds a masking threshold value. For example, when the A-channel bit allocator 13A completes bit allocation earlier than the B-channel bit allocator 13B, bit allocator 13A generates bit allocation completion information and outputs the same to bit allocator 13B. The bit allocation completion information includes the number of bits allocated to the A-channel divided bands. If the bit allocation completion information is applied to bit allocator 13B, the number of bits used for the bit allocation of the A-channel is subtracted from the predetermined number of bits of one audio frame. The difference between the number of bits obtained by the subtraction and the number of the allocated bits of the B-channel at the time of the completion of the bit allocation with respect to the A-channel, is used for bit allocation of the B-channel. For example, when one-hundred-sixty bits are given to one audio frame, A-channel bit allocator 13A uses seventy bits and completes the bit allocation with respect to all the divided bands of the A-channel. Then, bit allocator 13B can use the remaining ninety bits for bit allocation of the B-channel. Bit allocator 13B additionally uses the number of remaining bits after the completion of the bit allocation of the A-channel and continuously performs bit allocation with respect to the divided bands of the B-channel. Bit allocator 13B generates bit ratio information which represents a ratio of the number of bits which are used for the bit allocation of the A-channel to the number of bits which are used for the bit allocation of the B-channel, that is, M:N (M and N are integers). Here, M is the A-channel bit ratio and N is the B-channel bit ratio. Such bit ratio information is used for easily decoding the audio bit stream even if it is multiplexed with video data. When the bit allocation is accomplished with respect to the two channels, bit allocator 13A outputs the bit allocation information to quantizer 14A and multiplexer 15, and bit allocator 13B generates the bit ratio information and the bit allocation information and outputs the bit ratio information and the bit allocation information to multiplexer 15 and outputs the bit ratio information to quantizer 14B. Quantizer 14A quantizes the divided band signals input from divided band filter group 11A according to the applied bit allocation information, so as to output the result. Likewise, quantizer 14B quantizes the divided band signals input from divided band filter group 11B according to the applied bit allocation information, so as to output the result. As described above, a case where the A-channel bit allocation is earlier accomplished has been described. However, when the B-channel bit allocation is earlier accomplished, the FIG. 2 apparatus operates so that bit allocator 13B generates the bit allocation completion information and bit allocator 13A generates the bit ratio information.

Figure 3A:
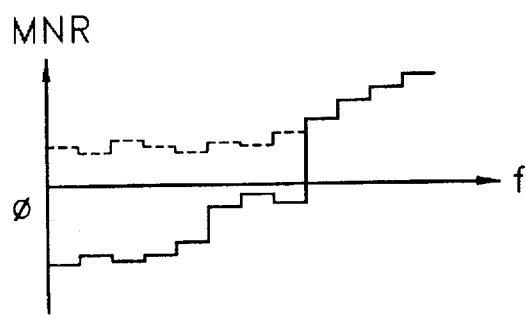
FIGS. 3A through 3D are graphical views for explaining an improved bit allocation method used by the FIG. 2 apparatus.
Figure 3B:
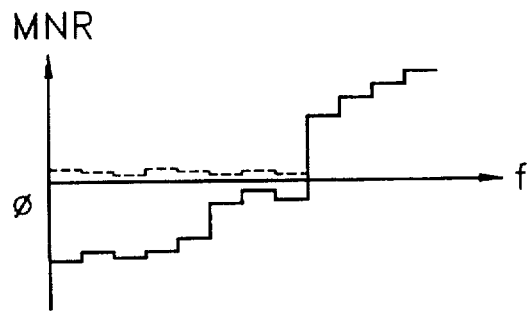
Figure 3C:
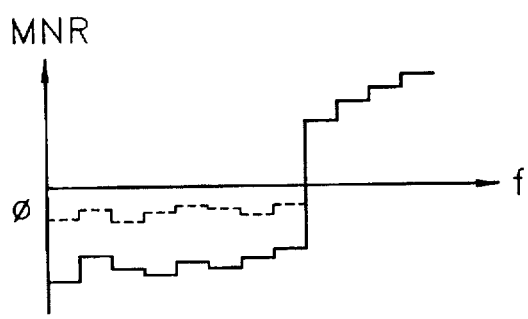
Figure 3D:
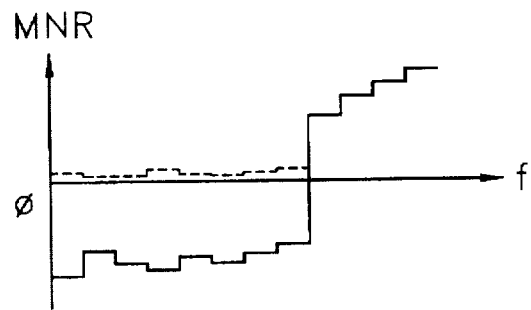

FIGS. 3A through 3D are graphical views for explaining an improved bit allocation method used in the FIG. 2 apparatus. In FIGS. 3A and 3B, solid lines represent values of the MNR of the respective divided bands or the frequency bands at the initial states prior to the bit allocation, and illustrate the respective MNR values of the divided bands with respect to the sampled audio signals of one channel where high frequency components do not exist, as in a human voice or a piano sound. In FIGS. 3C and 3D, solid lines represent the respective MNR values of the divided bands at the initial states prior to the bit allocation, and show the respective MNR values of the divided bands with respect to the sampled audio signals of the other channel where high frequency components exist as in a sound of a beat instrument. When comparing the initial MNR values of the two channels to each other, the MNR value of the high frequency domain of a beat instrument such as a drum has a lower value than the corresponding MNR value of the human voice or the piano sound. This is due to the fact that the sound of the beat instrument generally has a higher frequency component than that of the human voice, and the sound of the beat instrument has a relatively wide amplitude across a spectrum from a low frequency to a high frequency.

If the bit allocation is performed by the conventional method, the MNR values represented by the solid lines as shown in FIGS. 3A and 3C are changed into the MNR values represented by the dotted lines. However, in this case, the final MNR values with respect to the human voice have much larger values than zero, a masking threshold value over all of the divided bands as shown in FIG. 3A, while the final MNR values with respect to the sound of the beat instrument have values equal to or less than zero, the masking threshold value with respect to a plurality of the divided bands, as shown in FIG. 3C.

On the contrary, if the bit allocation with respect to the two channels using the bit allocation method according to the present invention is accomplished, the final MNR values have the MNR values represented by the dotted lines in FIGS. 3B and 3D. That is, after the bit allocation with respect to the two channels is accomplished, the MNR values (FIG. 3B) with respect to the human voice and the MNR values (FIG. 3D) with respect to the sound of the beat instrument exceed zero, the masking threshold value. Therefore, the user cannot hear noise from the reproduced sound, so that the quality of the sound is improved.

Returning to FIG. 2 again, multiplexer 15 multiplexes the signals quantized by quantizers 14A and 14B, the bit allocation information and/or the bit ratio information output from bit allocators 13A and 13B, and outputs the multiplexed result. The bit stream output from multiplexer 15 will be described below with reference to FIG. 4.

Figure 4:
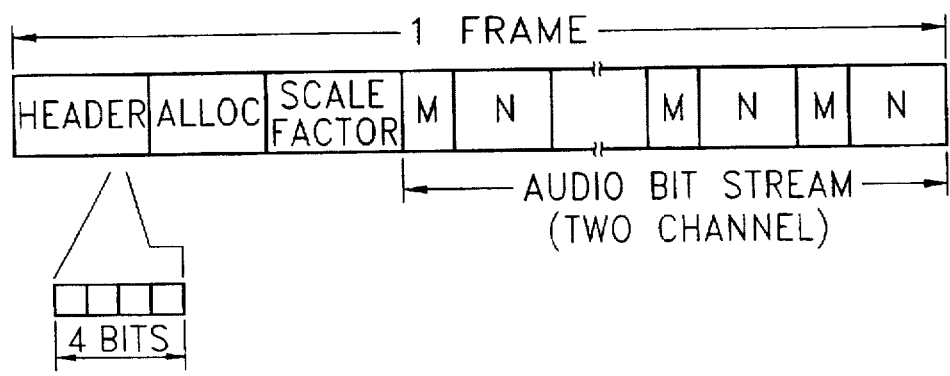
FIG. 4 shows a structure of a bit stream forming one audio frame according to one embodiment of the present invention.

FIG. 4 shows a structure of a bit stream forming one audio frame. The audio frame produced by multiplexer 15 is composed of 36-bit header data, bit allocation information, a scale factor and audio data, in sequence. The header data includes four-bit ratio information which represents a bit ratio of one channel with respect to the predetermined number of the bits in one audio frame in addition to thirty-two bits recommended by the MPEG. The bit allocation information is information for allocating the bits to each divided band. The scale factor is a well known parameter used for quantization. The audio data following the scale factor is composed of the A-channel audio data and the B-channel audio data, both of which are alternated. When the ratio information is composed of four bits, the bit ratio information which is actually produced by multiplexer 15 has a value of M−1. Thus, the bit ratio with respect to the B-channel becomes 16-(M−1). For example, if the bit ratio information which is produced by multiplexer 15 is five, M becomes six and N becomes ten. Thus, the audio data forming the bit stream has a format in which six bits of the A-channel and ten bits of the B-channel are alternated.

Figure 5:
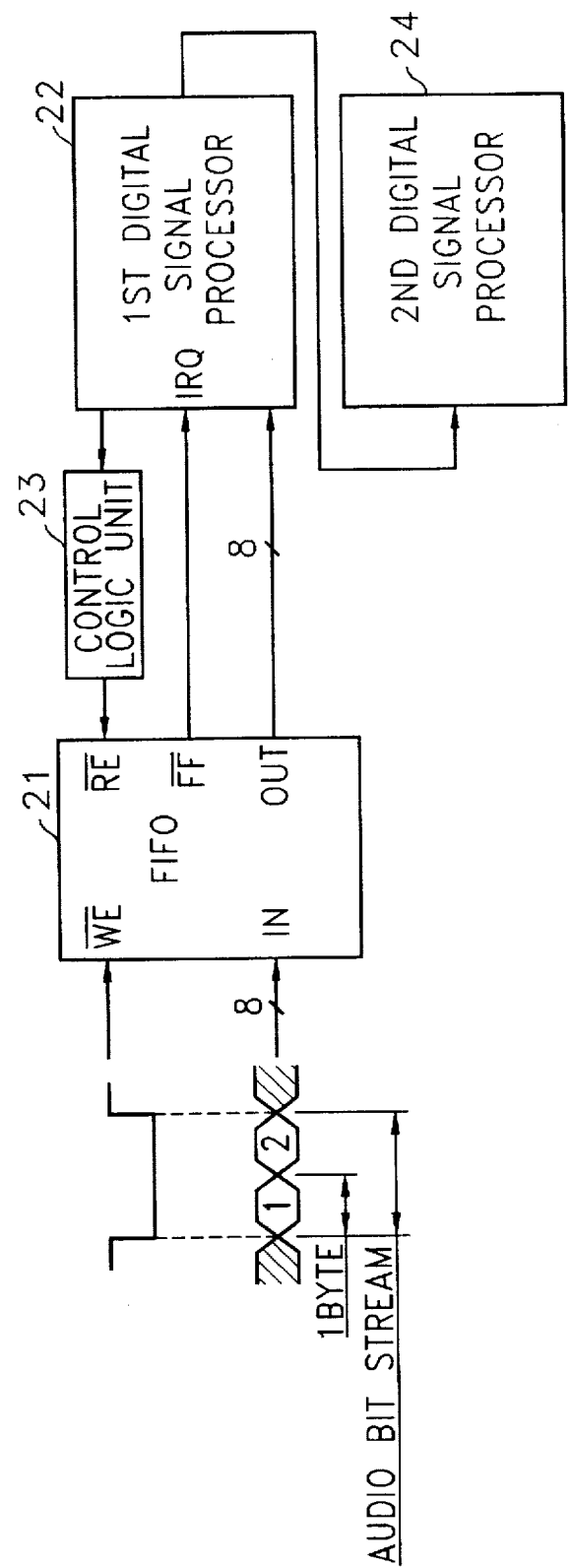
FIG. 5 is a block diagram of an apparatus for decoding an audio signal generated by the FIG. 2 apparatus.

FIG. 5 is a block diagram of an apparatus for decoding an audio signal generated by the FIG. 2 apparatus. In FIG. 5, FIFO memory 21 stores an audio bit stream which is applied thereto according to a write enable signal WE/ of a controller (not shown) and outputs the stored data according to read enable signal RE/ of control logic unit 23. A first digital signal processor 22 outputs a signal for controlling a read operation to control logic unit 23 in response to an interrupt signal IRQ applied from FIFO memory 21. First digital signal processor 22 also receives the audio bit stream read from FIFO memory 21 and decodes only the A-channel audio signal, while the B-channel audio signal is supplied to a second digital signal processor 24. Control logic unit 23 outputs read enable signal RE/ to FIFO memory 21 according to a control signal applied from first digital signal processor 22. Second digital signal processor 24 receives the B-channel audio signal and decodes the received audio signal.

The operation of the FIG. 5 apparatus as constructed above will be described below.

A bit stream having a video signal and a multiplexed audio signal is input to an input end IN of FIFO memory 21. A controller (not shown) generates a write enable signal WE/ for separating an audio signal from the bit stream. FIFO memory 21 stores the applied bit stream by one byte when write enable signal WE/ is at a low level. FIFO memory 21 outputs interrupt signal IRQ to first digital signal processor 22 through full flag end FF as soon as the memory becomes filled with data. First digital signal processor 22 outputs a control signal to control logic unit 23 as soon as the interrupt signal is applied thereto. Control logic unit 23 outputs read enable signal RE/ to FIFO memory 21 in response to the control signal. FIFO memory 21 outputs the bit stream having the A-channel audio data mixed with the B-channel audio data to first digital signal processor 22 in response to a low level state of read enable signal RE/. First digital signal processor 22 separates the input audio bit stream into the A-channel audio data and the B-channel audio data using the bit ratio information which is inserted in a header portion, and decodes only the A-channel audio data. The B-channel audio data output from first digital signal processor 22 is applied to second digital signal processor 24 which decodes the input B-channel audio data.

As described above, when audio data of at least two channels is encoded in the present invention, the number of the bits used by a channel of which the respective MNR values of the divided bands are all equal to or more than a predetermined value is reduced, and a like number of bits are additionally allocated to the other channel of which the respective MNR values are equal to or less than the predetermined value. Accordingly, the present invention has an effect of improving the quality of the sound so that the user cannot hear noise when an audio signal which includes many high frequency components is reproduced.

What is claimed is:

1. An encoding apparatus which utilizes masking characteristics of channels for bit allocation in order to encode digitally sampled audio signals of at least two channels in units of an audio frame, said encoding apparatus comprising:

a first divided band filter group for receiving a first channel audio signal, and for dividing the received first channel audio signal into predetermined divided bands and outputting a resulting audio signal;

first threshold value calculation means for receiving the first channel audio signal and the audio signal output by said first divided band filter group, and for calculating a first masking threshold value;

a second divided band filter group for receiving a second channel audio signal, and for dividing the received second channel audio signal into predetermined divided bands and outputting a resulting audio signal;

second threshold value calculation means for receiving the second channel audio signal and the audio signal output by said second divided band filter group, and for calculating a second masking threshold value;

bit allocation means for performing bit allocation to each of said first channel divided bands and to each of said second channel divided bands, for receiving the first masking threshold value and the second masking threshold value, for comparing a masking to noise ratio (MNR) of each of said divided bands of said first channel with said first masking threshold value and comparing each of said divided bands of said second channel with said second masking threshold value, detecting a channel having a masking to noise ratio (MNR) in which each bit allocated divided band exceeds a masking threshold value based on said comparing, determining a number of bits which are not employed for bit allocation in the detected channel based on said comparing, and using the number of bits which are not employed for bit allocation of the detected channel among a number of bits of one audio frame for bit allocation of another channel, and for producing bit allocation completion information corresponding to each channel and bit ratio information between the channels;

first quantization means for receiving and quantizing the audio signal output from said first divided band filter group in response to the bit allocation information of said bit allocation means and outputting the result as a signal;

second quantization means for receiving and quantizing the received audio signal output from said second divided band filter group in response to the bit allocation information of said bit allocation means and outputting the result as a signal; and multiplexing means for multiplexing signals output from said first and second quantization means, and the bit allocation information and the bit ratio information of said bit allocation means, and outputting the result as an encoded signal.

2. An encoding apparatus using masking characteristics of channels for bit allocation according to claim 1, wherein the audio frame has a predetermined number of bits and wherein said bit allocation means performs the bit allocation to each of said first channel divided bands and each of said second channel divided bands according to the predetermined number of bits of the audio frame.

3. An encoding apparatus using masking characteristics of channels for bit allocation in order to encode digitally sampled audio signals of at least two channels in units of an audio frame, said encoding apparatus comprising:

a first divided band filter group for receiving a first channel audio signal, and for dividing the received first channel audio signal into predetermined divided bands and outputting a resulting audio signal;

first threshold value calculation means for receiving the first channel audio signal and the audio signal output by said first divided band filter group, and for calculating a first masking threshold value;

a second divided band filter group for receiving a second channel audio signal, and for dividing the received second channel audio signal into predetermined divided bands and outputting a resulting audio signal;

second threshold value calculation means for receiving the second channel audio signal and the audio signal output by said second divided band filter group, and for calculating a second masking threshold value;

bit allocation means for performing bit allocation to each of said first channel divided bands and to each of said second channel divided bands, for receiving the first masking threshold value and the second masking threshold value, for comparing a masking to noise ratio (MNR) of each of said divided bands of said first channel with said first masking threshold value and comparing each of said divided bands of said second channel with said second masking threshold value, detecting a channel having a masking to noise ratio (MNR) in which each bit allocated divided band exceeds a masking threshold value based on said comparing, and for using a number of bits which are not used for bit allocation of the detected channel among a number of bits of one audio frame for bit allocation of another channel, and for producing bit allocation completion information corresponding to each channel and bit ratio information between the channels;

first quantization means for receiving and quantizing the audio signal output from said first divided band filter group in response to the bit allocation information of said bit allocation means and outputting the result as a signal;

second quantization means for receiving and quantizing the received audio signal output from said second divided band filter group in response to the bit allocation information of said bit allocation means and outputting the result as a signal; and multiplexing means for multiplexing signals output from said first and second quantization means, and the bit allocation information and the bit ratio information of said bit allocation means, and outputting the result as an encoded signal, wherein the audio frame has a predetermined number of bits and wherein said bit allocation means performs the bit allocation to each of said first channel divided bands and each of said second channel divided bands according to the predetermined number of bits of the audio frame, wherein said bit allocation means comprises:

a first bit allocator which allocates bits to the divided band of the first channel having the lowest MNR using the predetermined number of bits of the audio frame, calculates an MNR with respect to the bit-allocated divided bands of the first channel and compares the calculated MNR with the first masking threshold value; and a second bit allocator which allocates bits to a divided band of the second channel having the lowest MNR using the predetermined number of bits of the audio frame, calculates an MNR with respect to the bit-allocated divided bands of the second channel and compares the calculated MNR with the second masking threshold value;

wherein when said first bit allocator allocates bits with respect to all of the divided bands of the first channel so as to result in an MNR of the first channel exceeding the first masking threshold value earlier than said second bit allocator allocates bits with respect to all of the divided bands of the second channel, said first bit allocator outputs bit allocation completion information to said second bit allocator, and said second bit allocator generates bit ratio information based on the bit allocation completion information.

4. An encoding apparatus using masking characteristics of channels for bit allocation according to claim 3, wherein when said second bit allocator allocates bits with respect to all the divided bands of the second channel so as to result in an MNR of the second channel exceeding the second masking threshold value earlier than said first bit allocator allocates bits with respect to all of the divided bands of the first channel, said second bit allocator outputs bit allocation completion information to said first bit allocator, and said first bit allocator generates bit ratio information based on the bit allocation completion information.

5. An encoding apparatus using masking characteristics of channels for bit allocation according to claim 1, wherein said bit ratio information is determined based on a number of bits which are used for bit allocation of a channel in which the bit allocation is accomplished with respect to one audio frame earlier than the allocation is accomplished for another channel.

6. A decoding apparatus using masking characteristics of channels for bit allocation in order to distribute an encoded and multiplexed input audio bit stream of two channels into each channel and decode the distributed audio bit stream, said decoding apparatus comprising:

a first-in first-out (FIFO) memory for storing, according to a write enable signal, a bit stream in which externally supplied audio data of two channels is intermixed and outputting the stored data according to a read enable signal, and for generating an interrupt signal;

a first digital signal processor for generating a control signal for controlling a read operation by detecting the interrupt signal supplied from said FIFO memory, and for receiving the two-channel audio bit stream read from said FIFO memory and decoding only one-channel audio data therefrom, and for separating one-channel audio data from other-channel audio data;

control logic means for supplying the read enable signal to said FIFO memory according to the control signal supplied from said first digital signal processor; and a second digital signal processor for receiving the other-channel audio data separated from the one-channel audio data by said first digital signal processor and decoding the received other-channel audio data.

7. A decoding apparatus using masking characteristics of channels for bit allocation according to claim 6, wherein said FIFO memory outputs said interrupt signal as soon as the FIFO memory becomes full of audio data.

8. A decoding apparatus using masking characteristics of channels for bit allocation according to claim 6, wherein said first digital signal processor detects bit ratio information between the channels from the two-channel audio bit stream received from said FIFO memory and separates the respective channel audio data therefrom based on the detected bit ratio information.

9. An encoding method which utilizes masking characteristics of channels for bit allocation in order to encode digitally sampled audio signals of at least two channels in units of an audio frame having a predetermined number of bits, said encoding method comprising the steps of:

receiving a first channel audio signal;

dividing the received first channel audio signal into first channel divided bands and outputting a result;

calculating a first masking threshold value;

receiving a second channel audio signal;

dividing the received second channel audio signal into second channel divided bands and outputting a result;

calculating a second masking threshold value;

deriving a masking to noise ratio (MNR) through bit allocation for each of the first channel divided bands and each of the second channel divided bands, and comparing the calculated MNR of each of the first channel divided bands with the first masking threshold value and comparing the MNR of each of the second channel bands with the second masking threshold value;

detecting a channel having an MNR in which each bit allocated divided band exceeds a masking threshold value based on a result of the comparison performed in the deriving step;

determining a number of bits which are not employed for bit allocation in the detected channel based on said comparing;

using a number of bits which are not employed for bit allocation of the detected channel among the number of bits of one audio frame for bit allocation of a channel which is not detected in the detecting step to produce bit allocation information corresponding to each channel and bit ratio information between the channels;

receiving the bit allocation information corresponding to each channel and quantizing the input audio signal of each channel according to the bit allocation information and outputting the result; and multiplexing the bit ratio information, the bit allocation completion information and the quantized audio signal to produce an encoded signal.

10. An encoding method using masking characteristics of channels for bit allocation according to claim 9, wherein said calculation and comparison step comprises the steps of:

successively performing bit allocation with respect to the divided band which has the lowest MNR of the divided bands of a respective channel; and comparing the MNR corresponding to the divided band of which the bit allocation is accomplished with the masking threshold value of the corresponding channel.

11. An encoding method using masking characteristics of channels for bit allocation according to claim 9, wherein said bit allocation information is produced at a time when the bit allocation is accomplished with respect to the at least two channels.

12. An encoding method using masking characteristics of channels for bit allocation according to claim 9, wherein said bit ratio information represents a ratio between a number of allocated bits of the first channel and a number of allocated bits of the second channel at a time when the bit allocation is accomplished with respect to the at least two channels among the predetermined number of bits for one audio frame.

13. An encoding apparatus, comprising:

a bit allocator which receives a first audio signal of a first channel which is divided into a first plurality of bands and a second audio signal of a second channel which is divided into a second plurality of bands, compares a masking to noise ratio (MNR) of each of said first plurality of bands with a first masking threshold value and a masking to noise ratio of each of said second plurality of bands with a second masking threshold value, and, based on said comparing, allocates numbers of bits for use by said first channel and said second channel, wherein said bit allocator allocates bits of either each of said first plurality of bands or each of said second plurality of bands based on said comparing, detects one of the first channel and the second channel having a masking to noise ratio in which each bit allocated divided band exceeds a masking threshold value, determines a number of bits which are not required for bit allocation in the detected channel based on said comparing, and uses the number of bits which are not required for bit allocation of the detected channel among a number of bits of one audio frame for bit allocation of another channel.

14. An encoding apparatus according to claim 13, wherein said bit allocator produces bit allocation completion information and bit ratio information.

15. An encoding apparatus according to claim 14, further comprising quantization means for receiving and quantizing the signal of the first channel which is divided into a first plurality of bands and the second channel which is divided into a second plurality of bands in response to the bit allocation completion information.

16. An encoding apparatus according to claim 15, further comprising multiplexing means for multiplexing signals output from said quantization means, the bit allocation information and the bit ratio information of said bit allocation means, and outputting the result as an encoded signal.

17. An encoding apparatus according to claim 16, further comprising:

a first divided band filter group for receiving a first channel audio signal, and for dividing the received first channel audio signal into predetermined divided bands and outputting a resulting audio signal as the first plurality of bands; and a second divided band filter group for receiving a second channel audio signal, and for dividing the received second channel audio signal into predetermined divided bands and outputting a resulting audio signal as the second plurality of bands.

18. An encoding apparatus according to claim 17, further comprising:

first threshold value calculation means for receiving the first plurality of bands, and for calculating the first masking threshold value based on the first plurality of bands; and second threshold value calculation means for receiving the second plurality of bands and for calculating the second masking threshold value based on the second plurality of bands.

* * * * *